United States Patent
Dreps et al.

(10) Patent No.: US 7,239,213 B2
(45) Date of Patent: Jul. 3, 2007

(54) REDUCED CROSS-TALK SIGNALING CIRCUIT AND METHOD

(75) Inventors: Daniel M. Dreps, Georgetown, TX (US); Anand Haridass, Austin, TX (US); Bao G. Truong, Austin, TX (US); Joel D. Ziegelbein, Iowa City, IA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/209,549

(22) Filed: Aug. 23, 2005

(65) Prior Publication Data
US 2007/0046389 A1 Mar. 1, 2007

(51) Int. Cl.
*H01P 1/00* (2006.01)
(52) U.S. Cl. ............ 333/1; 333/5; 326/30; 326/86
(58) Field of Classification Search ............ 333/1, 333/4, 5; 326/86, 90, 30
See application file for complete search history.

(56) References Cited
U.S. PATENT DOCUMENTS

| 6,034,551 | A | * | 3/2000 | Bridgewater, Jr. ............ 326/82 |
| 6,522,173 | B1 | * | 2/2003 | Otsuka ........................ 326/101 |

* cited by examiner

*Primary Examiner*—Benny Lee
(74) *Attorney, Agent, or Firm*—Winstead PC

(57) ABSTRACT

Signaling between two or more ICs use a signaling scheme wherein a reference signal is generated at the driver side and the receiver side. The driver side reference signal is coupled to the receiver side reference signal with a transmission line channel forming a reference channel. Data signal channels are paired with a reference channel between each two adjacent data channels. Adjacent pairs of data signal channels are each separated with an empty wiring channel. The paired data signals are received in one input of a differential receiver. The reference signal of the reference channel between the two paired data channels is coupled to the other input of the two differential receivers. Coupling from the paired data channels to the reference channel appears a common mode noise and is rejected by the differential receivers. The number of channels is reduced from a full differential signaling scheme.

19 Claims, 4 Drawing Sheets

REDUCED CROSS-TALK SIGNALING CIRCUIT AND METHOD

TECHNICAL FIELD

The present invention relates in general to board level transmission line drivers and receivers, and in particular, to methods for reducing noise coupling between adjacent data channels.

BACKGROUND INFORMATION

Digital computer systems have a history of continually increasing the speed of the processors used in the system. As computer systems have migrated towards multiprocessor systems, sharing information between processors and memory systems has also generated a requirement for increased speed for the off-chip communication networks. Designers usually have more control over on-chip communication paths than for off-chip communication paths. Off-chip communication paths are longer, have higher noise, impedance mismatches, and have more discontinuities than on-chip communication paths. Since off-chip communication paths are of lower impedance, they require more current and thus more power to drive.

When using inter-chip high-speed signaling, noise and coupling between signal lines (cross talk) affects signal quality. One way to alleviate the detrimental effects of noise and coupling is through the use of differential signaling. Differential signaling comprises sending a signal and its compliment to a differential receiver. In this manner, noise and coupling affect both the signal and the compliment equally. The differential receiver only senses the difference between the signal and its compliment as the noise and coupling represent common mode signals. Therefore, differential signaling is resistant to the effects that noise and cross talk have on signal quality. On the negative side, differential signaling increases pin count by a factor of two for each data line. Additionally, an empty wiring channel is usually added between each differential channel which further adds to the wiring inefficiency.

The logic levels of driver side signals are determined by the positive and ground voltage potentials of the driver power supply. If the driver power supply has voltage variations that are unregulated, then the logic one and logic zero levels of the driver side signals will undergo similar variations. If the receiver is substantially remote from the driver such that its power supply voltage may undergo different variations from the driver side power supply, then additional variations will be added to any signal received in a receiver side terminator (e.g., Thevenin's network). A Thevenin's network is the equivalent circuit of a network between two terminals consisting of the open circuit Thevenin's voltage, measured at across the two terminals, in series with the Thevenin's impedance. The Thevenin's impedance is determined as the impedance between the two terminals with all voltage sources replaced with short circuits and all current sources replaced with open circuits. These power supply variations will reduce noise margins if the reference has variations different from those on the received signals caused by the driver and receiver side power supply variations. Also cross-talk between adjacent channels may lead to reduce "eye" patterns defining detection margins for signal transitions.

There is, therefore, a need for a signaling scheme that generates a reference wherein receiver side and driver side power supply noise is common mode, wiring channels are reduced, and differential receivers may be employed to reject common mode noise from power supplies and from cross-talk coupling between adjacent data channels.

SUMMARY OF THE INVENTION

The present invention generates a receiver side reference signal by voltage dividing the power supply at the driver side to generate a driver side reference signal. The driver side reference signal is coupled with a transmission line forming a reference channel. The driver side reference signal is coupled to a receiver side reference signal generated by voltage dividing the power supply voltage at the receiver side.

Adjacent data signals are paired and driven single ended from the driver side through transmission lines forming data channels. The data channels of the adjacent data signals are separated by a common reference channel. The adjacent data channels are coupled to one input of two differential receivers while their other inputs are coupled to the common reference signal transmitted over the common reference channel. Driver side and receiver side power supply noise is coupled as a common mode signal to the reference signal of the common reference channel. Cross talk from the paired data channels is reduced by the presence of the common reference channel. Common mode rejection of the differential receivers further removes noise. Adjacent paired data channels are separated by an empty wiring channel to reduce coupling between paired data channels.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
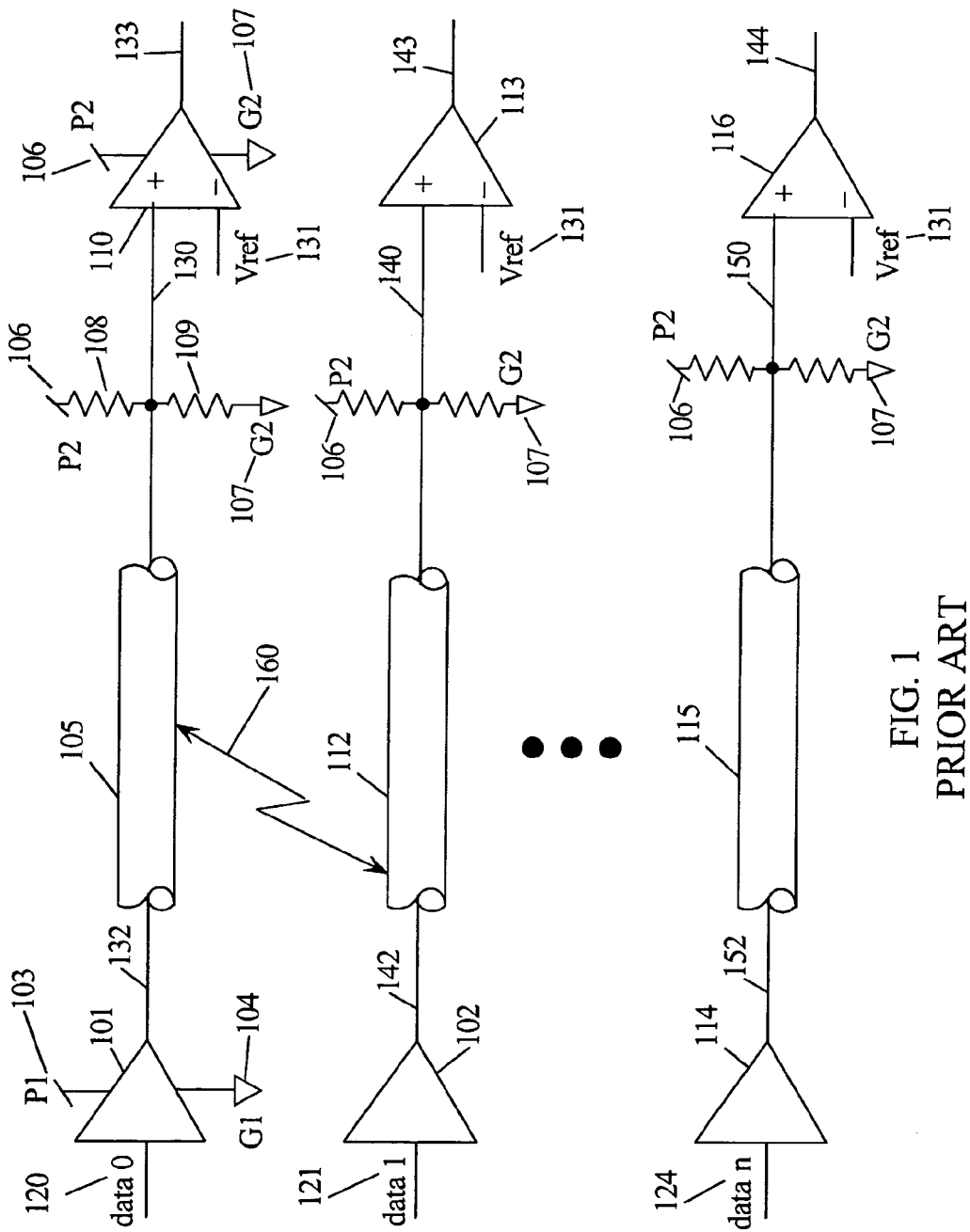
FIG. 1 is a circuit diagram of prior art pseudo-differential signaling with Thevenin's equivalent resistive divider termination.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 is a circuit diagram of typical pseudo-differential signaling for transmitting data from a driver to a receiver. Drivers 101, 102 and 114 represent three of a number of n drivers sending data signals 132, 142, and 152 to receivers 110, 113 and 116, respectively which receive data signals 130, 140 and 150 with any added drive side coupled noise or cross-talk noise resulting from transmission of transmission lines 105, 112 and 115. Exemplary drivers 101, 102, 114 receive data 0 120, data 1 121, and data n 124, respectively, and generate output data signals 132, 142 and 152 that swing between power supply rail voltages P1 103 (logic one) and G1 104 (logic zero). When the exemplary data signal 132 is at P1 103, any noise on the power bus is coupled to transmission line 105 along with the logic state of the data signal 132. Exemplary transmission line 105 is terminated with a voltage divider comprising resistors 108 and 109. Receiver input 130 has a DC bias value determined by the voltage division ratio of resistors 108 and 109 and the voltage between P2 106 and G2 107. Receivers 110 is also powered by voltages P2 106 and G2 107 which may have different values from P1 103 and G1 104 due to distribution losses, noise coupling, and dynamic impedance of the distribution network. Exemplary receivers 110, 113 and 116 are typically voltage comparators or high gain amplifiers that amplify the difference between a signal at their inputs 130, 140 and 150 and a reference voltage Vref 131 and generate outputs 133, 143, and 144, respectively. While Vref 131 may be a stable reference, it may not track variations in power supply P1103. While capacitor filtering may reduce high frequency noise on Vref 131, variations in power supply voltage P2 106 are not tightly coupled to Vref 131. The variations in power supply voltages P1 103 and P2 106 are coupled to the data inputs (e.g., 130) differently than variations are coupled to Vref 131. Likewise, power supply noise is coupled to the data inputs differently and thus noise and power supply variations do not manifest themselves as common mode signals that may be reduced by the common mode rejection capabilities of the differential receivers (e.g., 110, 113, and 116). This reduces the effectiveness of pseudo-differential signaling.

Figure 2:
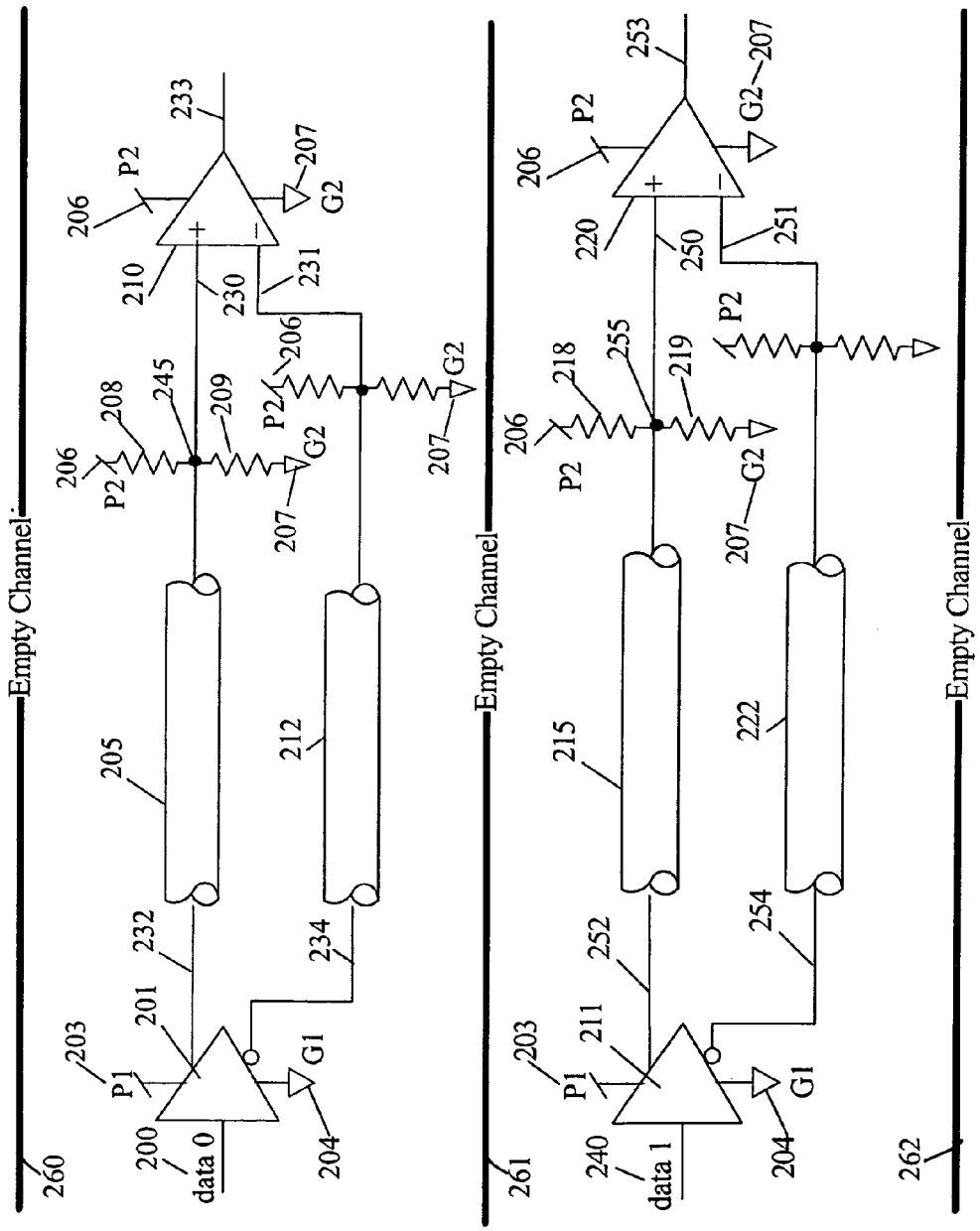
FIG. 2 is a circuit diagram of prior art differential signaling.

To solve the problems of single ended signal transmission, differential signaling is used. FIG 2 is a circuit diagram of prior art differential signaling. Exemplary differential drivers 201 and 211 receive transmit data signals data 0 200 and data 1 240 and output differential data signals 232, 234 and 252, 254, respectively. Differential data signals 232, 234 and 252, 254 are transmitted to differential receivers 210 and 220 via transmission line pairs 205, 212, and 215, 222 respectively. Exemplary differential drivers 201, and 211 are characterized as having driver outputs that generate complementary signals 232, 234 that switch between their power supply voltage potentials (e.g., P1 203 and G1 204) thereby coupling these voltage potentials to the input of transmission lines 205 and 212 with a source impedance. Transmission line pairs 205, 212 and 215, 222 are terminated with resistive voltage dividers (e.g., resistor dividers 208, 209 and 218, 219). The exemplary resistive voltage divider (termination network) comprising resistors 208 and 209 and power supply voltage potentials P2 206 and G2 207 form a Thevenin's voltage source at the input 230. This Thevenin's voltage source has an impedance equal to the parallel combination of resistors 208 and 209 and a Thevenin's voltage equal to the voltage at node 245 whose value is between voltage potentials P2 206 and G2 207. Exemplary data signals, data 0 200 and data 1 240 generate complementary data signals 232 and 234 and 252 and 254, respectively. These signals are received in receivers 210 and 220 as complementary signals 230–231 and 250–251, respectively, thereby generating detected outputs 233 and 253.

Data 1 240 is coupled to differential driver 211 in a data channel separated from the data channel of with an empty wiring channel 261. Likewise, the data channel of differential driver 201 is separated from its preceding data channel (not shown) by an empty wiring channel 260 and the data channel of differential driver 211 is separated from following data channel (not shown) by empty wiring channel 262. While the differential signaling provides good noise reduction and channel isolation, the price is six wiring channels for two data channels.

Figure 3:
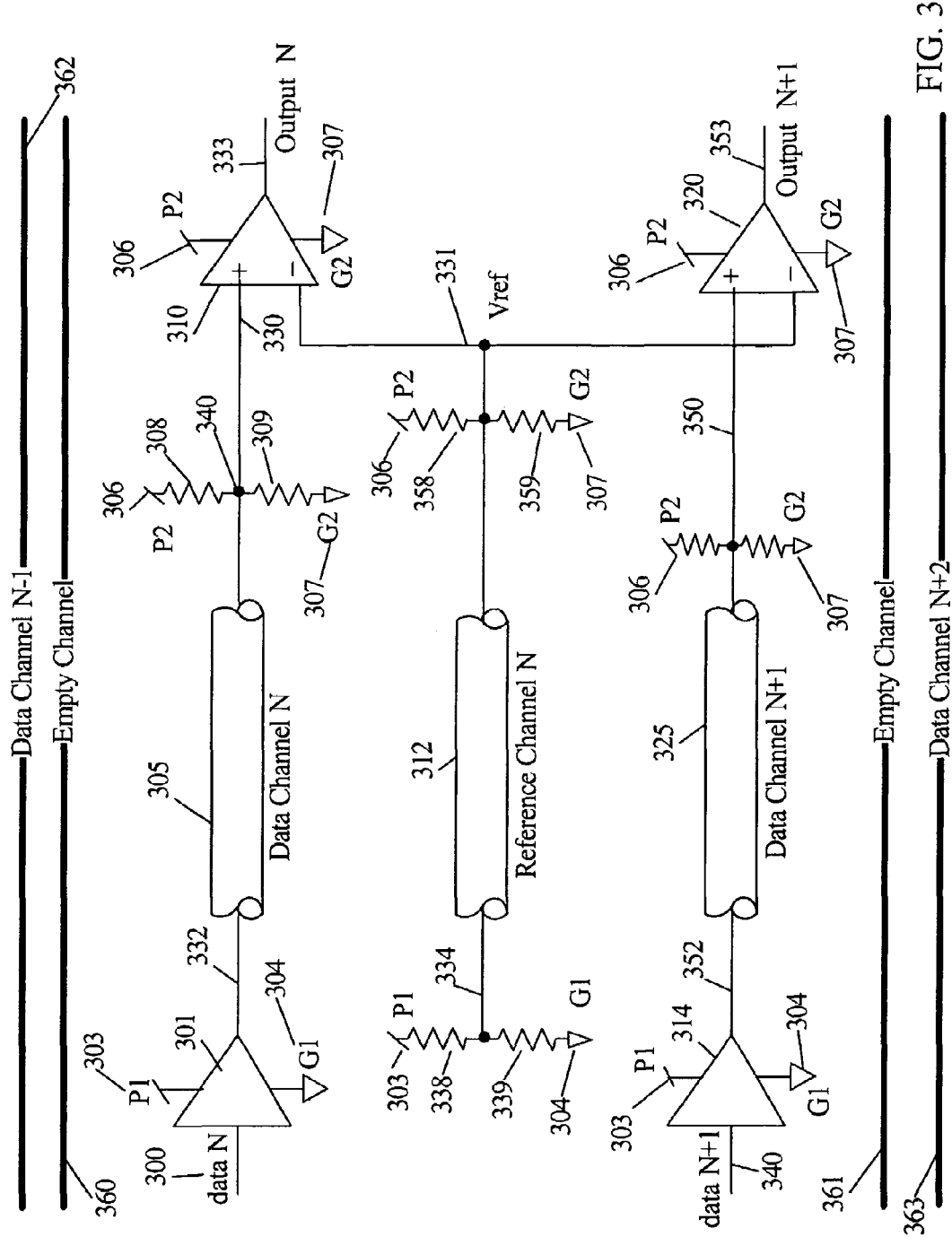
FIG. 3 is a circuit diagram of paired data channels with differential receivers according to embodiments of the present invention.

FIG. 3 is a circuit diagram of reduced cross-talk signaling according to embodiments of the present invention. Drivers 301 and 314 receive data inputs data N 300 and data N+1 340 of paired adjacent data channels. Exemplary driver 301 generates signal 332 that is coupled to transmission line 305 (data channel N). Exemplary driver 314 generates signal 352 that is coupled to transmission line 325 (data channel N+1). The next data channel preceding data channel N 305 is data channel N−1 362. The next data channel following data channel N+1 325 is data channel N+2 363. Drivers 301 and 314 are powered by driver side power supply voltage potentials P1 303 and G1 304. A reference signal 334 is generated by voltage divider resistors 338 and 339. Power supply noise from P1 303 and G1 304 will appear as common mode noise on the data signals 332 and 352 and reference signal 334. Reference signal 334 is coupled to transmission line 312 (reference channel N) which couples reference signal 334 to the voltage divider formed by resistors 358 and 359 and receiver side power supply voltage potentials P2 306 and G2 307. Reference signal Vref 331 is the combination of these two reference signals wherein the power supply noise from the receiver side and the driver side appear at the inputs of both receivers 310 and 320. Exemplary receivers 310 and 320 generate output N 333 and output N+1 353, respectively.

The data signals 332 and 352 are transmitted over transmission lines 305 and 325, respectively, and are terminated in voltage divider termination networks (e.g., voltage divider resistors 308 and 309) at node 340. In this manner, power supply noise from the driver side and the receiver side appear as common mode noise to differential receivers 310 and 320. Since the reference channel (transmission line 312) of Vref 331 is in close proximity and between transmission line 305 and 325, cross-talk from a data signal 352 propagating on transmission line 325 will couple to both transmission line 305 and 312 and will appear as a common mode signal to differential receiver 310. Likewise, cross-talk from a data signal 332 propagating on transmission line 305 will couple to both transmission line 312 and 325 and will appear as a common mode signal to differential receiver 320. While the coupling from a data channel to the adjacent data channel and reference channel are not identical, they serve to reduce the noise since a portion of the cross-talk noise appears as a common mode signal to the input of a corresponding differential receiver. Receiver outputs 333 and 353 are generated as the amplified difference between their inputs (330 and 350) and the common reference signal Vref 331. Additionally, an empty wiring channel (e.g., empty channels 360 and 361) are placed between paired data channels to reduce coupling between pairs of data channels.

The voltage divider termination networks on transmission lines 305 and 325 are designed to have a Thevenin's voltage substantially equal to Vref 331 and an impedance substantially equal to the characteristic impedance of transmission lines 305 and 325. The voltage dividers at the driver side (resistors 338 and 339) and at the receiver side (resistors 358 and 359) are designed to each have a Thevenin's impedance substantially equal to the characteristic impedance of transmission line 312.

The cross-talk reduction scheme of FIG. 3 improves signal quality while reducing the number of wiring channels needed when compared to the differential signaling of FIG. 2. The reduced cross-talk signaling according to embodiments of the present invention uses two wiring channels (the data channel, one half of the reference channel and one half of the empty wiring channel) for each data channel as compared to three wiring channels (the data and complement data channels and one half of the two empty wiring channels) for each data channel required for full differential signaling of FIG. 2.

The scheme of FIG. 3, according to embodiments of the present invention, takes the two channels used for the complement signal in full differential signaling and replaces them with a single reference channel that provides shielding from cross-talk noise as well as couples power supply noise from the driver side and receiver side so that the common mode rejection of the differential receivers can reduce this noise on the data channels. Thus three improvements are realized; reduced number of signal channels, reduced cross-talk noise, and rejection of power supply noise using the common mode rejection of differential receivers.

Figure 4:
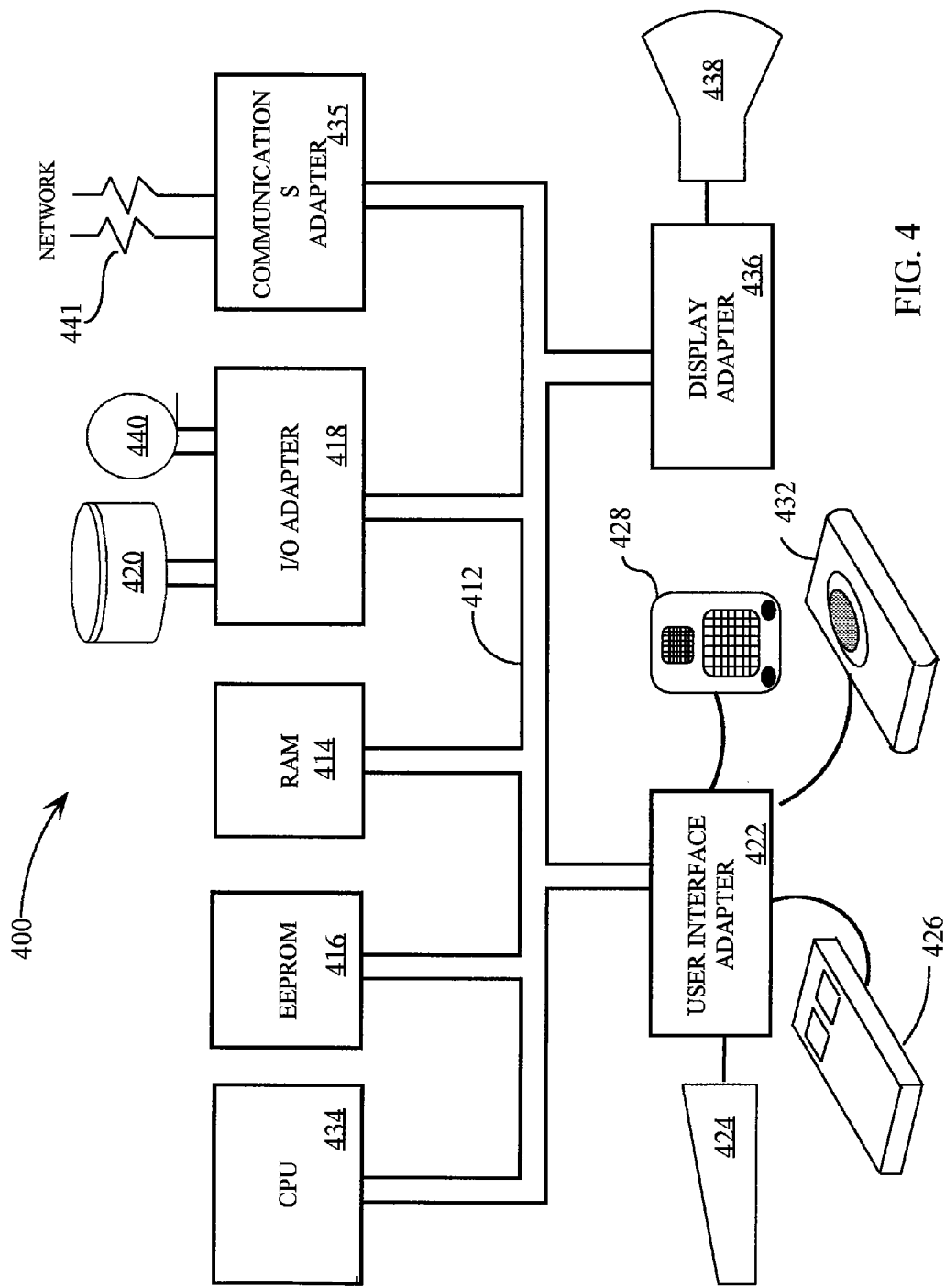
FIG. 4 is a data processing system suitable for practicing embodiments of the present invention.

FIG 4 is a high level functional block diagram of a representative data processing system 400 suitable for practicing the principles of the present invention. Data processing system 400 includes a central processing system (CPU) 434 operating in conjunction with a system bus 412. System bus 412 operates in accordance with a standard bus protocol, such as the ISA protocol, compatible with CPU 434. CPU 434 operates in conjunction with electronically erasable programmable read-only memory (EEPROM) 416 and random access memory (RAM) 414. Among other things, EEPROM 416 supports storage of the Basic Input Output System (BIOS) data and recovery code. RAM 414 includes, DRAM (Dynamic Random Access Memory) system memory and SRAM (Static Random Access Memory) external cache. I/O Adapter 418 allows for an interconnection between the devices on system bus 412 and external peripherals, such as mass storage devices (e.g., a hard drive, floppy drive or CD/ROM drive), or a printer 440. A peripheral device 420 is, for example, coupled to a peripheral control interface (PCI) bus, and I/O adapter 418 therefore may be a PCI bus bridge. User interface adapter 422 couples various user input devices, such as a keyboard 424, speaker 428, track ball 432, or mouse 426 to the processing devices on bus 412. Display 438 which may be, for example, a cathode ray tube (CRT), liquid crystal display (LCD) or similar conventional display units. Display adapter 436 may include, among other things, a conventional display controller and frame buffer memory. Data processing system 400 may be selectively coupled to a computer or telecommunications network 441 through communications adapter 435. Communications adapter 435 may include, for example, a modem for connection to a telecom network and/or hardware and software for connecting to a computer network such as a local area network (LAN) or a wide area network (WAN). CPU 435 and other components of data processing system 400 may contain logic circuitry in two or more integrated circuit chips that are separated by a significant distance relative to their communication frequency such that noise reduction is needed to improve reliability. The cross-talk coupling of adjacent data channels may be improved by applying a reference channel between the two data channels and receiving the data signals in differential receivers each coupled to the reference channel according to embodiments of the present invention.

Although the present invention and its advantages have been described in detail, it should be understood that various changes, substitutions and alterations can be made herein without departing from the spirit and scope of the invention as defined by the appended claims.

What is claimed is:

1. A reduced cross-talk signaling system for a number N parallel bus lines comprising:

a data channel N having a first transmission line coupling an output of a single ended driver N to a first input of a differential receiver N;

a data channel N+1 having a second transmission coupling an output of a single ended driver N+1 to a first input of a differential receiver N+1;

a reference channel N having a third transmission line disposed between and parallel to the first and second transmission lines, wherein the third transmission line couples a first reference voltage generated at a driver side thereof, a second reference voltage generated at a receiver side thereof, and providing second inputs of the differential receivers N and N+1 thereby generating a combined reference voltage; and an empty wiring channel N adjacent to and parallel to the first transmission line and disposed between the first transmission line and a data channel N−1 having a structure similar to data channel N and data channel N+1.

2. The system of claim 1, wherein the first reference voltage is generated in response to a voltage division of positive and negative voltage potentials of a power supply powering the corresponding single ended drivers N and N+1 in a reference resistive voltage divider.

3. The system of claim 2, wherein the second reference voltage is generated in response to a voltage division of positive and negative voltage potentials of a power supply powering the corresponding differential receivers N and N+1 in a reference resistive voltage divider.

4. The system of claim 3, wherein the first and second transmission lines are terminated in respective termination networks each comprising a voltage divider between the positive and negative voltage potentials of the power supply powering the corresponding differential receivers N and N+1, the termination networks each having a Thevenin's voltage substantially equal to the combined reference voltage and a Thevenin's impedance substantially equal to the characteristic impedance of the first and second transmission lines.

5. The system of claim 3, wherein the reference voltage divider has a Thevenin's impedance substantially equal to the characteristic impedance of the third transmission line.

6. The system of claim 2, wherein the reference voltage divider has a Thevenin's impedance substantially equal to the characteristic impedance of the third transmission line.

7. A data processing system comprising:
a central processing unit (CPU);
a random access memory (RAM) for storing data and instructions for the CPU; and
a bus for coupling the CPU and RAM having a number M parallel data channels using a reduced cross-talk signaling system with a data channel N having a first transmission line coupling an output of a single ended driver N to a first input of a differential receiver N, a data channel N+1 having a second transmission coupling an output of a single ended driver N+1 to a first input of a differential receiver N+1, a reference channel N having a third transmission line disposed between and parallel to the first and second transmission lines, wherein the third transmission line couples a first reference voltage generated at a driver side thereof, a second reference voltage generated at a receiver side thereof, and poviding second inputs of the differential receivers N and N+1 thereby generating a combined reference voltage, and an empty wiring channel N adjacent to and parallel to the first transmission line and disposed between the first transmission line and a data channel N−1 having a structure similar to data channel N and data channel N+1.

8. The data processing system of claim 7, wherein the first reference voltage is generated in response to a voltage division of positive and negative voltage potentials of a power supply powering the corresponding single ended drivers N and N+1 in a reference resistive voltage divider.

9. The data processing system of claim 8, wherein the second reference voltage is generated in response to a voltage division of positive and negative voltage potentials of a power supply powering the corresponding differential receivers N and N+1 in a reference resistive voltage divider.

10. The data processing system of claim 9, wherein the first and second transmission lines are terminated in respective termination networks each comprising a voltage divider between the positive and negative voltage potentials of the power supply powering the corresponding differential receivers N and N+1, the termination networks each having a Thevenin's voltage substantially equal to the combined reference voltage and a Thevenin's impedance substantially equal to the characteristic impedance of the first and second transmission lines.

11. The data processing system of claim 9, wherein the reference voltage divider has a Thevenin's impedance substantially equal to the characteristic impedance of the third transmission line.

12. The data processing system of claim 8, wherein the reference voltage divider has a Thevenin's impedance substantially equal to the characteristic impedance of the third transmission line.

13. A method for reducing cross-talk between adjacent data channels in a number M channel bus comprising the steps of:

generating a driver side reference voltage;

coupling the driver side reference voltage to an input of a reference transmission line and coupling the output of the reference transmission line to a receiver side reference voltage thereby generating a combined reference voltage;

disposing the reference transmission line parallel to and between a first transmission line of data channel N and a second transmission line of data channel N+1; and disposing an empty data channel N−1 adjacent to and parallel to data channel N.

14. The method of claim 13 further comprising receiving a signal from the first transmission line in a first input of a differential receiver N;

receiving a signal from the second transmission line in a first input of a differential receiver N+1;

coupling the combined reference voltage to a second input of the differential receivers N and N+1; and generating receiver output signals N and N+1 as the amplified difference between data signals at the first inputs of the differential receivers N and N+1 and the combined reference voltage.

15. The method of claim 13, wherein the first reference voltage is generated in response to a voltage division of positive and negative voltage potentials of a power supply powering the corresponding single ended drivers N and N+1 in a reference resistive voltage divider.

16. The method of claim 15, wherein the second reference voltage is generated in response to a voltage division of positive and negative voltage potentials of a power supply powering the corresponding differential receivers N and N+1 in a reference resistive voltage divider.

17. The method of claim 16, wherein the first and second transmission lines are terminated in respective termination networks each comprising a voltage divider between the positive and negative voltage potentials of the power supply powering the corresponding differential receivers N and N+1, the termination networks each having a Thevenin's voltage substantially equal to the combined reference voltage and a Thevenin's impedance substantially equal to the characteristic impedance of the first and second transmission lines.

18. The method of claim 16, wherein the reference voltage divider has a Thevenin's impedance substantially equal to the characteristic impedance of the third transmission line.

19. The method of claim 15, wherein the reference voltage divider has a Thevenin's impedance substantially equal to the characteristic impedance of the third transmission line.

* * * * *